United States Patent
Obara

[11] Patent Number: 5,820,273
[45] Date of Patent: Oct. 13, 1998

[54] HARD DISC DRIVE WITH A COMPOUND BEARING ASSEMBLY

[75] Inventor: Rikuro Obara, Nagano-ken, Japan

[73] Assignee: Minebea Kabushiki-Kaisha, Nagano-ken, Japan

[21] Appl. No.: 732,731

[22] Filed: Oct. 18, 1996

[30] Foreign Application Priority Data

Oct. 20, 1995 [JP] Japan .................................. 7-297392
Oct. 20, 1995 [JP] Japan .................................. 7-297393

[51] Int. Cl.$^6$ ...................................................... F16C 19/30
[52] U.S. Cl. ............................................. 384/613; 384/615
[58] Field of Search .................................. 384/613, 615, 384/617, 499, 501, 504

[56] References Cited

U.S. PATENT DOCUMENTS 4,493,514  1/1985  Henry ...................................... 384/613
4,934,843  6/1990  Nakanishi ............................... 384/613
5,639,168  6/1997  Noguchi et al. ........................ 384/613

*Primary Examiner*—Lenard A. Footland
*Attorney, Agent, or Firm*—Lowe, Price, LeBlanc & Becker

[57] ABSTRACT

A hard disc drive is disclosed, which comprises a compound bearing assembly including stepped shaft 1 having a large-diameter portion 1a and a small-diameter portion 1b, a plurality of balls 4 provided between an outer raceway groove 2b formed in the inner periphery of an outer race ring 3 and an inner raceway groove 2a directly formed in the outer periphery of the large-diameter portion 1a, and a plurality of balls 8a provided between an inner raceway groove 6a formed in the outer periphery of an inner race ring 7a fitted on the small-diameter portion 1b of the stepped shaft 1 and an outer raceway groove 6b directly formed in the inner periphery of a portion of a sleeve-like outer race ring 5 adjacent an end thereof. A hub 12 of a rotor 11 of a motor of the hard disc drive is fitted on the compound bearing assembly.

4 Claims, 4 Drawing Sheets

HARD DISC DRIVE WITH A COMPOUND BEARING ASSEMBLY

BACKGROUND OF THE INVENTION

1. Field of the Invention

This invention relates to improvements in the bearing part of the motor of a hard disc drive.

2. Description of the Prior Art

The hard disc drive may use a spindle motor. The spindle motor comprises a motor shaft, a rotor, a base and a yoke holder. The motor shaft is supported in a bearing assembly, which is provided in a bearing sleeve and includes an inner and an outer race ring and balls.

A prior art bearing assembly, as shown in FIGS. 8(a) and 8(b), comprises two ball bearing units A and B and a sleeve-like spacer C. These components are produced separately and supplied to the user, i.e., a hard disc drive manufacturer, for assembling on a motor shaft D.

As shown, with the conventional bearing assembly of the motor in the hard disc drive, it is necessary for the hard disc drive manufacturer to assemble the two ball bearing units on the motor shaft via a spacer. This poses the following problems.

(a) The motor shaft has to be prepared with its outer diameter sized to the inner race rings of the ball bearing units.

(b) The spacer is a separate component from the two ball bearing units, and to be able to fit the dimensions of the ball bearing units to be assembled with it the parallelism between and flatness of its opposite end portions should be highly accurate, thus requiring highly accurate finishing.

(c) The opposite end surfaces of the spacer should be in uniform contact with the corresponding end surfaces of the outer race rings of the ball bearing units. This requires cumbersome machining and assembling works.

(d) Unless all the above requirements are fully met, vibrations of the motor shaft and the disc may result, it is impossible to obtain a hard disc drive having excellent rotational performance, but vibrations of the motor shaft or the disc may result.

SUMMARY OF THE INVENTION

An object of the invention is to provide a hard disc drive having improved performance, which can solve problems discussed above and permits its manufacturer to use a bearing assembly with the components thereof having already been assembled directly for its motor.

A hard disc drive according to a first aspect of the invention comprises a compound bearing assembly, which includes a stepped shaft having a large-diameter portion and a small-diameter portion, a plurality of balls provided between an outer raceway groove formed in the inner periphery of an outer race ring and an inner raceway groove directly formed in the outer periphery of the large-diameter portion of the stepped shaft, and a plurality of balls provided between an inner raceway groove formed in the outer periphery of an inner race ring fitted on the small-diameter portion of the stepped shaft and an outer raceway groove directly formed in the inner periphery of a portion of a sleeve-like outer race ring adjacent one end thereof, and on which a hub of a rotor of a motor of the hard disc drive is fitted.

A hard disc drive according to a second aspect of the invention comprises a compound bearing assembly, which includes a stepped shaft having a large-diameter portion and a small-diameter portion, a plurality of balls provided between an outer raceway groove directly formed in the inner periphery of a portion of a sleeve-like outer race ring adjacent one end thereof and an inner raceway groove directly formed in the outer periphery of the large-diameter portion of the stepped shaft, and a ball bearing unit having an inner and an outer race ring and a plurality of balls provided therebetween, the inner race ring of the ball bearing unit being fitted on the small-diameter portion of the stepped shaft, a hub of a rotor of a motor of the hard disc drive being fitted on and secured to the compound bearing assembly.

A hard disc drive according to a third aspect of the invention comprises a compound bearing assembly, which includes a stepped shaft having a large-diameter portion and a small-diameter portion, a plurality of balls provided between an inner raceway groove directly formed in the outer periphery of the large-diameter portion of the stepped shaft and an outer raceway groove formed in the inner periphery of an outer race ring surrounding the large-diameter portion, the inner race ring of the ball bearing unit being fitted on the small-diameter portion of the stepped shaft, and a sleeve-like outer race ring interposed between the outer race ring of the ball bearing unit and the outer race ring surrounding the large-diameter portion, a hub of a rotor of a motor of the hard disc drive being fitted on and secured to the compound bearing assembly.

DETAILED DESCRIPTION OF THE PREFERRED EMBODIMENTS

Figure 2:
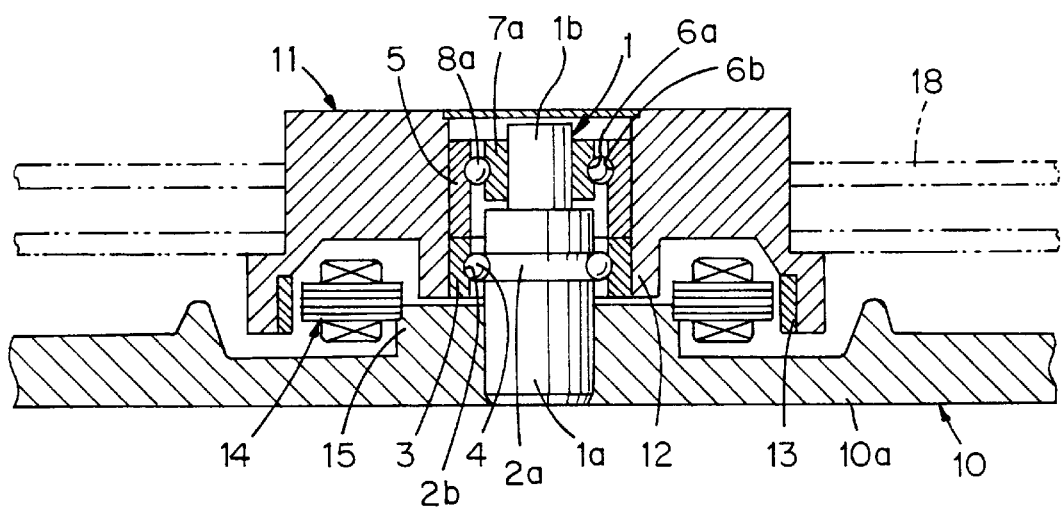
FIG. 2 is a sectional view showing a first embodiment of an outer rotor type motor in the hard disc drive according to the invention.

Referring to FIG. 2, reference numeral 1 designates a stepped shaft which has a large-diameter portion 1a and a small-diameter portion 1b. The large-diameter portion 1a has an inner raceway groove 2a directly formed in its outer periphery.

Reference numeral 3 designates an outer race ring, which is assembled on the large-diameter portion 1a of the stepped shaft 1 with a plurality of balls 4 provided between an outer raceway groove 2b formed in its inner periphery and the inner raceway groove 2a formed in the large-diameter portion 1a.

Reference numeral 5 designates a sleeve-like outer race ring, which is assembled on the small-diameter portion 1b of the stepped shaft 1 with a plurality of balls 8a provided between an outer raceway groove 6b directly formed in the inner periphery of its upper end portion and an inner raceway groove 6a formed in the outer periphery of an inner race ring 7a fitted on the small-diameter portion 1b.

The inner race ring 7a which is fitted on the small-diameter portion 1a of the stepped shaft 1, has an equal outer diameter to that of the large-diameter portion 1a, so that the balls 4 and 8a are the same in diameter.

In assembling, the inner race ring 7a is initially slidably fitted on the small-diameter portion 1b of the stepped shaft 1. Then, an adequate pre-load is applied to the upper end surface of the inner race ring 7a, and in this state the inner race ring 7a is secured by means of an adhesive to the small-diameter portion 1b. In this way, the outer race ring 3, the sleeve-like outer race ring 5 and the inner race ring 7a are assembled on the stepped shaft 1.

The bearing assembly which has been assembled in the above way, has the stem (or lower end) of the large-diameter portion 1a of the stepped shaft 1 secured to a base 10a of a housing 10 of the hard disc drive such that the stepped shaft 1 extends upright from the base 10a. Then, the outer race rings 3 and 5 of the bearing assembly is fitted on and secured to a hub 12 depending from the lower surface center of a rotor 11 of the motor.

Figure 1:
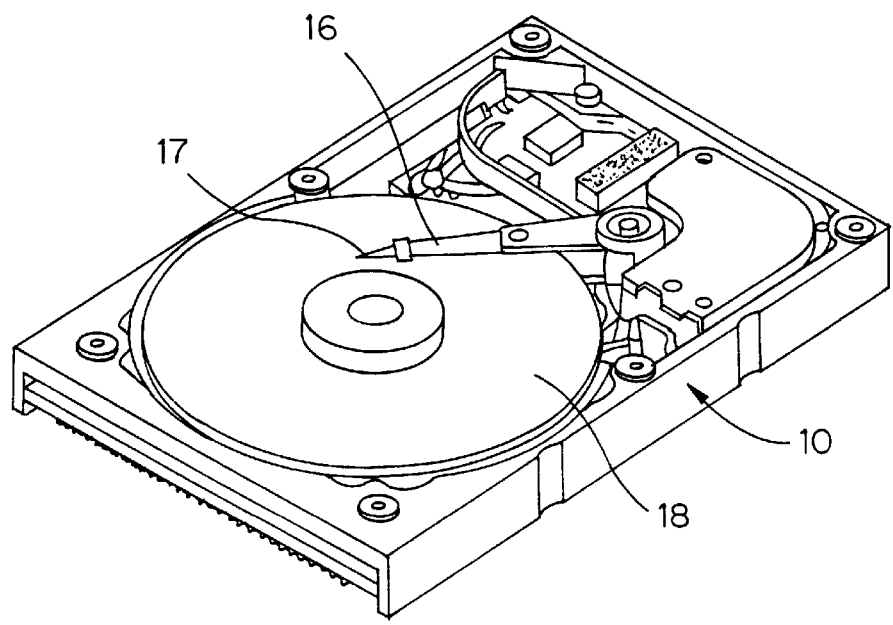
FIG. 1 is a perspective view showing a hard disc drive.

Reference numeral 13 designates a magnet, 14 a stator yoke with an energizing coil wound thereon, and 15 a yoke holder. In FIG. 1, reference numeral 16 designates a swing arm with a magnetic head 17 provided at the end, and 18 a magnetic disc.

Figure 3:
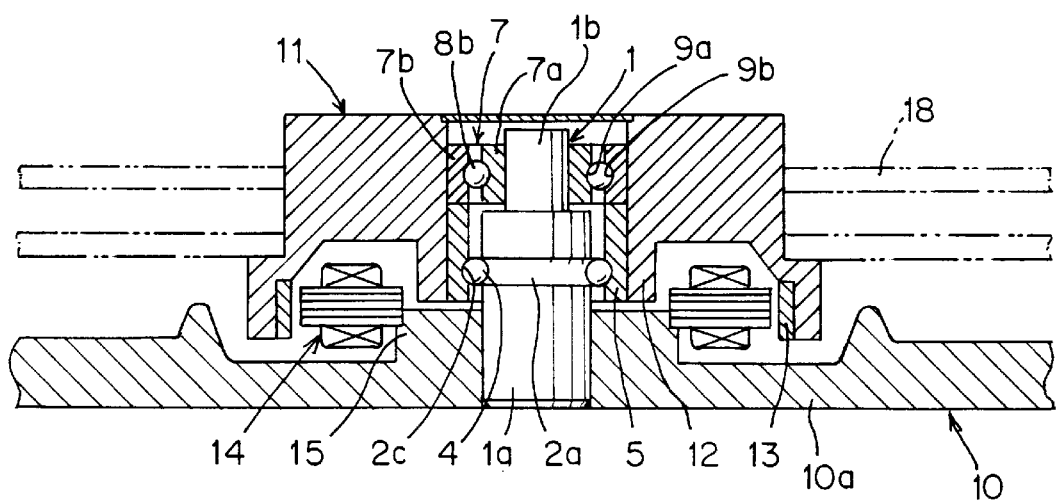
FIG. 3 is a sectional view showing a second embodiment of the outer rotor type motor in the hard disc drive according to the invention.

FIG. 3 shows a second embodiment of the hard disc drive according to the invention using a different bearing assembly.

Again this embodiment, the inner raceway groove 2a is directly formed in the outer periphery of the large-diameter portion 1a of the stepped shaft 1 of the bearing assembly.

In this embodiment, a sleeve-like outer race ring 5 which surrounds the large-diameter portion 1a of the stepped shaft 1, has an outer raceway groove 2c directly formed in the inner periphery of its lower end portion, with the balls 4 provided between the outer raceway groove 2c and the inner raceway groove 2a of the large-diameter portion 1a.

A conventional ball bearing unit 7 which includes an inner and an outer race ring 7a and 7b and balls 8b provided therebetween, is provided on the small-diameter portion 1b of the stepped shaft 1 with the inner race ring 7a fitted on and secured to the small-diameter portion 1b.

The inner race ring 7a of the ball bearing unit 7 has an equal outer diameter to that of the large-diameter portion 1a of the stepped shaft 1, and the outer race ring 7b has equal outer and inner diameters to those of the sleeve-like outer race ring 5, so that the balls 4 and 8b are equal in diameter.

In assembling, the inner race ring 7a of the ball bearing unit 7 is initially slidably fitted on the small-diameter portion 1b of the stepped shaft 1, then an adequate pre-load is applied to the upper end surface of the inner race ring 7a, and in this state the inner race ring 7a is secured by means of an adhesive to the small-diameter portion 1b. In this way, the outer race ring, the sleeve-like outer race ring 5 and the inner race ring are assembled to the stepped shaft 1.

Figure 4:
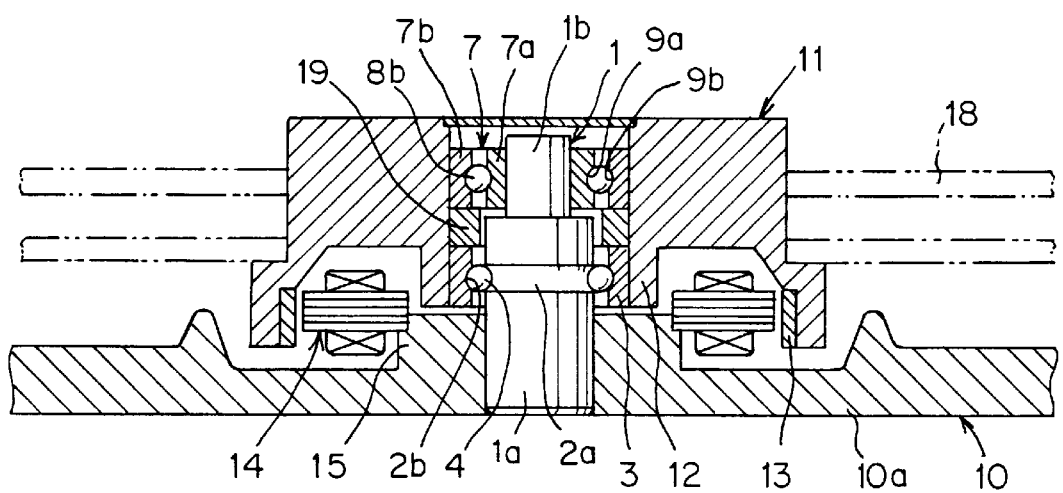
FIG. 4 is a sectional view showing a third embodiment of the outer rotor type motor in the hard disc drive according to the invention.

FIG. 4 shows a third embodiment of the hard disc drive according to the invention using a further different bearing assembly.

Again in this embodiment, the inner raceway groove 2a is directly formed in the outer periphery of the large-diameter portion 1a of the stepped shaft 1.

Reference numeral 3 designates a large-diameter portion side outer race ring, which is assembled on the large-diameter portion 1a of the stepped shaft 1 with the balls provided between an outer raceway groove 2b formed in its inner periphery and the inner raceway groove 2a directly formed in the large-diameter portion 1a.

A conventional ball bearing unit 7 which includes an inner and an outer race ring 7a and 7b and balls 8b provided therebetween, is provided on the small-diameter portion 1b of the stepped shaft 1, with the inner race ring 7a fitted on and secured to the small-diameter portion 1b.

Reference numeral 19 designates a sleeve-like spacer which surrounds the stepped shaft 1 and is clampedly interposed between the outer race ring 3 on the side of the large-diameter portion 1a and the outer race ring 7b of the ball bearing unit 7.

Like the preceding second embodiment, the inner race ring 7a of the ball bearing unit 7 in this embodiment has an equal outer diameter to that of the large-diameter portion 1a of the stepped shaft 1, and the outer race ring 7b has equal outer and inner diameters to those of the outer race ring 3 on the large-diameter portion side, so that the balls 4 and 8b are the same in diameter.

In assembling, the inner race ring 7a of the ball bearing unit 7 is initially slidably fitted on the small-diameter portion 1b of the stepped shaft 1, then an adequate pre-load is applied to the upper end surface of the inner race ring 7a, and in this state the inner race ring 7a is secured by means of an adhesive to the small-diameter portion 1b of the stepped shaft 1. In this way, the outer race rings 3 and 7b, the spacer 19 and the inner race ring 7a are assembled on the stepped shaft 1.

Reference symbols 9a and 9b designate the raceway grooves in the inner and outer race rings 7a and 7b of the ball bearing unit 7, and the balls 8b are retained therein by retainers (not shown).

While in the above first to third embodiments the balls 4 and 8b were the same in diameter, it is possible to use balls having different diameters on the sides of the large- and small-diameter portions 1a and 1b, respectively.

Figure 5:
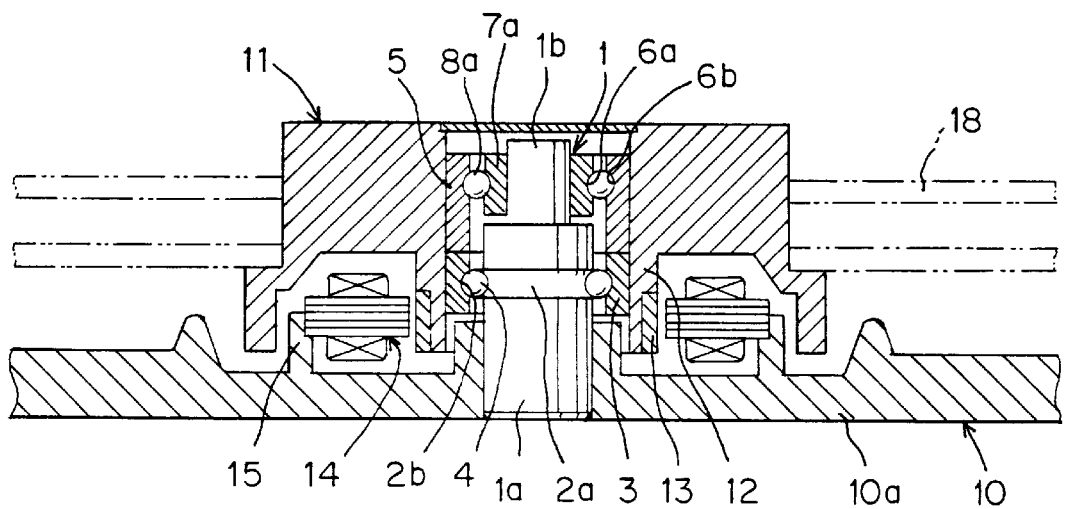
FIG. 5 is a sectional view showing a first embodiment of an inner rotor type motor in the hard disc drive according to the invention.
Figure 6:
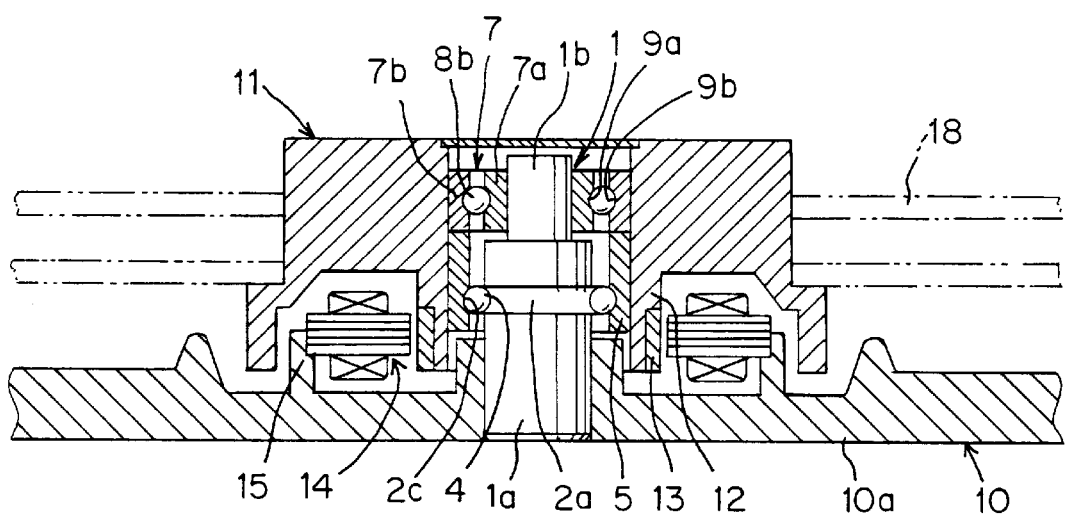
FIG. 6 is a sectional view showing a second embodiment of the inner rotor type motor in the hard disc drive according to the invention.
Figure 7:
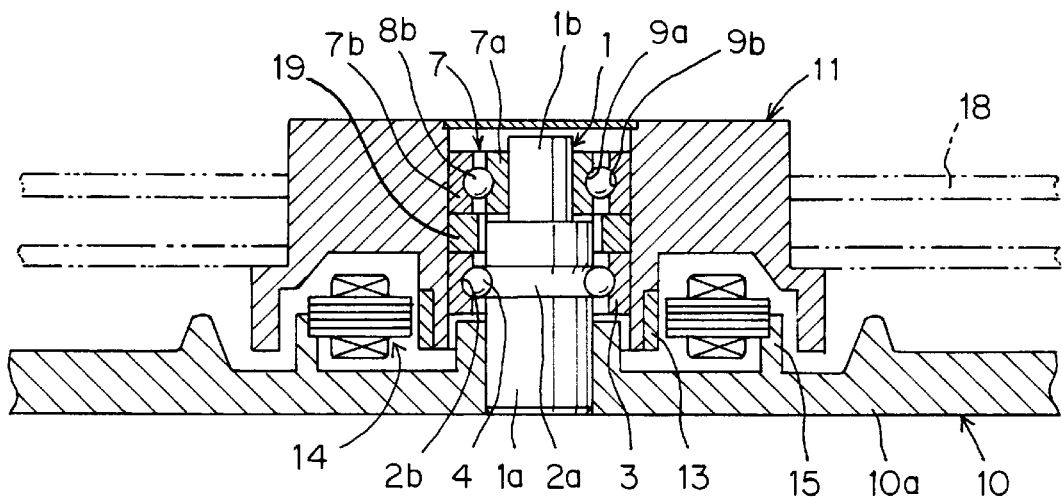
FIG. 7 is a sectional view showing a third embodiment of the inner rotor type motor in the hard disc drive according to the invention.
Figure 8A:
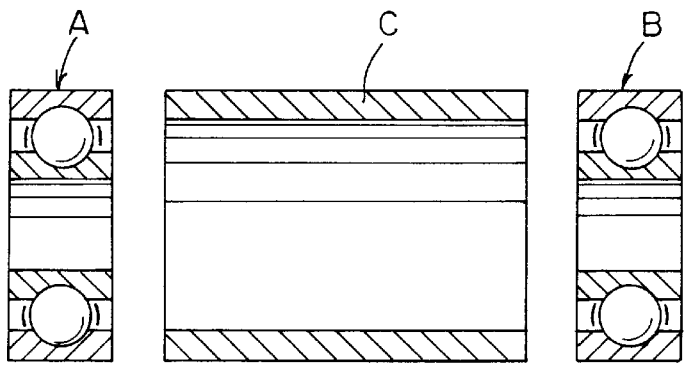
FIGS. 8(a) and 8(b) are sectional views showing a prior art bearing assembly, FIG. 8(a) showing two ball bearing units and a spacer before assembling, FIG. 8(b) showing the ball bearing units and spacer assembled on a motor shaft.
Figure 8B:
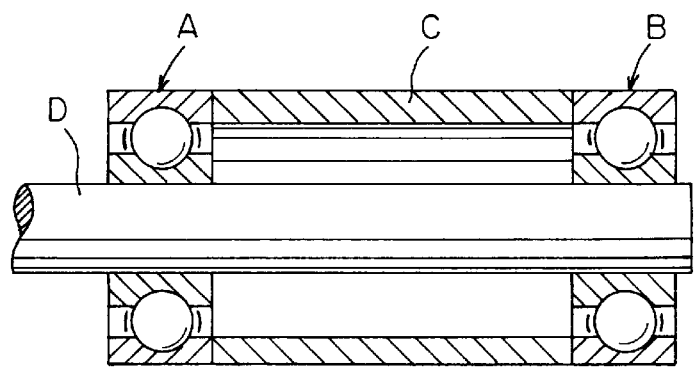

While the above embodiments concerned with the hard disc drives using the outer rotor type motors, the invention is also applicable to inner rotor type motors as shown in FIGS. 5 to 7, in which the magnet 13 is provided on the outer side of the hub 12 of the rotor 11.

With the motor in the hard disc drive according to the invention, in which the bearing assembly has the construction as described in the foregoing, the following advantageous functions and effects are obtainable.

(1) Since the inner race ring, the outer race ring, the sleeve-like outer race ring and the balls of the compound bearing assembly are assembled on the motor shaft by the bearing manufacturer, it is not necessary for the hard disc drive manufacturer to assemble these components, and the rotor of the motor can be readily mounted on the bearing assembly by fitting and securing the hub of the motor with respect to the sleeve-like outer race ring of the bearing assembly.

(2) Since the large-diameter portion of the stepped shaft in the bearing assembly according to the invention has the inner raceway groove directly formed in its outer periphery, the conventional inner race ring is unnecessary, and correspondingly the shaft is partly increased in diameter to provide the stepped shaft, which thus has increased rigidity.

(3) Since the stepped shaft has the large-diameter portion and has increased rigidity, the resonance point of the shaft can be made high compared to those of the other components to prevent resonance with the other components and thus improve the performance and reliability of the motor. It is thus possible to provide a hard disc drive which is less subject to surface vibrations.

(4) The bearing assembly according to the invention need only a single conventional ball bearing unit, and hence only a single inner race ring, and it can comprise a reduced number of components.

(5) Since the large-diameter portion of the stepped shaft has the inner raceway groove directly formed in its outer periphery, no inner race ring is needed for the large-diameter portion side. The necessity of no inner race ring permits corresponding reduction of the outer diameter of the outer race ring. It is thus possible to provide a compact hard disc drive as desired.

What is claimed is:

1. A hard disc drive comprising a compound bearing assembly including:

a stepped shaft (1) having a large-diameter portion 1a and a small-diameter portion (1b), said large-diameter portion (1a) having an inner raceway groove (2a) directly formed therein, an inner race ring (7a) being fitted on said small-diameter portion (1b);

a sleeve-like outer race ring (5) surrounding said stepped shaft (1) and having a distinct-member outer race ring (3) provided as adjacent one end and an outer raceway groove directly formed in the inner periphery of a portion adjacent the other;

a plurality of first balls (4) received in said inner raceway groove (2a) of said large-diameter portion (1a) and retained in an outer raceway groove (2b) formed in said distinct-member outer race ring (3) or in an outer raceway groove (2c) formed in the inner periphery of said sleeve-like outer race ring (5); and a plurality of balls (8a) received in an inner raceway groove formed in an inner race ring (7a) fitted on said small-diameter portion (1b) of said stopped shaft (1) and retained in said outer raceway groove (6b) directly formed in the inner periphery of said sleeve-like outer race ring (5) or in an outer raceway groove (9b) formed in the inner periphery of an outer race ring (7b);

said stepped shaft (1) being erected from a base (10a) of said hard disc drive with a stem portion of said large-diameter portion (1a) secured to said base (10a), said hard disc drive further comprising a motor including a rotor (11) having a central hub (12) fitted on and secured to said compound bearing assembly.

2. The hard disc drive according to claim 1, wherein said balls (4) received in said inner raceway groove (2a) directly formed in the outer periphery of said large-diameter portion (1a) of said compound bearing assembly is retained in said outer raceway groove (2b) of said outer race ring (3), and said balls (8a) received in said inner raceway groove (6a) of said inner race ring (7a) fitted on said small-diameter portion (1b) is retained in said outer raceway groove (6b) directly formed in the inner periphery of said sleeve-like outer race ring (5).

3. The hard disc drive according to claim 1, wherein said balls (4) received in said inner raceway groove (2a) directly formed in the outer periphery of said large-diameter portion (1a) of said compound bearing assembly is retained in said outer raceway groove (2c) directly formed in the inner periphery of said sleeve-like outer race ring (5), and said balls (8b) received in said inner raceway ring (9a) of said inner race ring (7a) fitted on said large-diameter portion (1b) is retained in said outer race ring (9b) formed in the inner periphery of said outer race ring (7b).

4. A hard disc drive comprising a compound bearing assembly including:

a stepped shaft (1) having a large-diameter portion (1a) and a small-diameter portion (1b);

an outer race ring (3) surrounding said large-diameter portion (1a) of said stepped shaft (1);

a plurality of balls (4) provided between an inner raceway groove (2a) directly formed in the outer periphery of said large-diameter portion (1a) and an outer raceway groove (2b) formed in the inner periphery of said outer race ring (3);

a ball bearing unit (7) having an inner and an outer race ring (7a) and (7b) and a plurality of balls (8b) provided therebetween, said inner race ring (7a) being fitted on said small-diameter portion (1b) of said stepped shaft (1) via a sleeve-like spacer (16); and a sleeve-like spacer (16) interposed between said outer race ring (7b) of said ball bearing unit (7) and said outer ring (3) surrounding said large-diameter portion (1a) of said stepped shaft (1);

said stepped shaft (1) being erected from a base (10a) of said hard disc drive with a stem portion of said large-diameter portion (1a) secured to said base (10a), said hard disc drive further comprising a motor including a rotor (11) having a central hub (12) fitted on and secured to said compound bearing assembly.

* * * * *